United States Patent [19]

Frielingsdorf et al.

[11] 4,110,522
[45] Aug. 29, 1978

[54] MANUFACTURE OF OLEFIN POLYMERS

[75] Inventors: Hans Frielingsdorf, Bad Duerkheim; Wolfgang Gruber, Frankenthal; Heinz Mueller-Tamm, Ludwigshafen, all of Fed. Rep. of Germany

[73] Assignee: BASF Aktiengesellschaft, Ludwigshafen am Rhein, Fed. Rep. of Germany

[21] Appl. No.: 761,258

[22] Filed: Jan. 21, 1977

[30] Foreign Application Priority Data

Feb. 6, 1976 [DE] Fed. Rep. of Germany ....... 2604550

[51] Int. Cl.² .................... C08F 4/02; C08F 4/24; C08F 10/00
[52] U.S. Cl. .................... 526/105; 252/430; 252/451; 252/452; 526/106; 526/352
[58] Field of Search .............. 526/105, 106; 252/430, 252/451, 452

[56] References Cited

U.S. PATENT DOCUMENTS

| | | | |
|---|---|---|---|
| 3,081,286 | 3/1963 | McKinnis | 526/105 |
| 3,639,378 | 2/1972 | Long | 526/105 |
| 3,639,381 | 2/1972 | Craven | 526/105 |
| 3,759,918 | 9/1973 | Yamaguchi et al. | 526/105 |
| 3,767,635 | 10/1973 | Yamaguchi et al. | 526/105 |
| 3,878,179 | 4/1975 | Hogan | 526/105 |
| 3,919,185 | 11/1975 | Takebe et al. | 526/105 |
| 3,947,433 | 3/1976 | Witt | 526/105 |
| 3,956,257 | 5/1976 | Hogan | 526/105 |
| 3,959,178 | 5/1976 | Hogan | 526/105 |
| 4,025,707 | 5/1977 | Hogan | 526/105 |
| 4,037,042 | 7/1977 | Mueller-Tamm et al. | 526/106 |

*Primary Examiner*—Alan Holler
*Attorney, Agent, or Firm*—Keil, Thompson & Shurtleff

[57] ABSTRACT

A process for the manufacture of olefin polymers by polymerizing α-monoolefins of 2 to 8 carbon atoms by means of a catalyst which is obtained from a silicate carrier (component a), an organo-metallic compound containing alkoxide groups (component b) and a chromium compound (component c), wherein the catalyst employed is obtained by (1) first charging (1.1) a finely divided porous xerogel (component a) of the formula $SiO_2 \cdot m\, Al_2O_3$, where m is a number from 0 to 2, with (1.2) a particular aluminum compound containing alkoxide groups (component b), (2) then charging (2.1) the product obtained from stage (1) with (2.2) a particular chromium compound (component c) by treatment with a solution of the chromium compound, with intimate mixing and evaporation of the solvent and (3) finally heating the product, obtained from stage (2), in an anhydrous stream of gas containing oxygen. This process makes it possible to influence the essential properties of the polymers in relatively diverse ways, in the desired direction, by relatively slight modifications of the catalyst.

7 Claims, No Drawings

MANUFACTURE OF OLEFIN POLYMERS

The present invention relates to a process for the manufacture of olefin polymers by polymerizing α-monoolefins of 2 to 8 carbon atoms at from 60° to 160° C. and olefin pressures of from 0.5 to 40 bars by means of a catalyst which is obtained from a silicate carrier (component a), an organometallic compound containing alkoxide groups (component b) and a chromium compound (component c).

Several embodiments of processes of this type are known; these conventional processes share the feature that in the catalyst used the component (b) serves to give a catalyst which in itself contains functional alkoxide groups. These alkoxide groups serve, for example, to regulate the molecular weight of the polymers (cf. German Laid-Open Application DOS 2,240,246, German Laid-Open Application DOS 2,329,738 and U.S. Pat. No. 3,324,101) and to alter the activity of the catalyst (cf. German Laid-Open Application DOS 1,926,346) or influence the "memory effect" of the polymers (cf. German Published Application DAS 2,052,573).

It is an object of the present invention to provide, for the process defined at the outset, a catalyst which is inherently "flexible", i.e. which is simple to modify and makes it possible to influence, through such modifications, essential properties of the polymers, in the desired direction, for example to increase the density, melt index and G-modulus simultaneously, or to lower them simultaneously. It is a further object to provide a catalyst which is able to give polymers which are particularly suitable for the manufacture of relatively small moldings by the blow-molding process, i.e. polymers which have markedly good flow, and which give hollow articles without or virtually without, melt fracture or weld lines, which articles furthermore exhibit high stress crack resistance.

We have found that this object is achieved by providing a catalyst which has been obtained by first charging a particular silicate carrier (a) with a particular organoaluminum compound (b) containing alkoxide groups, then charging the resulting product with a particular chromium compound (c) and heating the resulting product in an oxygen-containing stream of gas at a high temperature.

Accordingly, the present invention relates to a process for the manufacture of olefin polymers by polymerizing α-monoolefins of 2 to 8 carbon atoms at from 60° to 160° C., especially from 80° to 110° C., and olefin pressures of 0.5 to 40, especially from 4 to 15, bars, by means of a catalyst obtained from a silicate carrier (component a), an organo-metallic compound containing alkoxide groups (component b) and a chromium compound (component c), wherein the catalyst employed is obtained by (1) first charging (1.1) a finely divided xerogel (component a) which has a particle diameter of from 20 to 2,000 μm, especially from 40 to 300 μm, a pore volume of from 0.7 to 2.6 cm³/g, especially from 1 to 2.5 cm³/g, and a surface area of from 150 to 600 m²/g, especially from 300 to 600 m²/g, and which has the formula $$SiO_2 \cdot m\ Al_2O_3$$

where $m$ is a number from 0 to 2, especially from 0 to 0.5, with (1.2) an aluminum compound containing alkoxide groups (component b) of the general formula

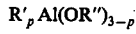

$$R'_p Al(OR'')_{3-p}$$

where R' is alkyl of 1 to 8 carbon atoms, especially alkyl of 1 to 4 carbon atoms, R" is open-chain alkyl of 1 to 8 carbon atoms or cyclic alkyl of 5 to 8 carbon atoms, especially alkyl of 6 to 8 carbon atoms which contains a $C_6$-ring, and $p$ is a number from 0 to 2, especially from 0 to 1, (2) then charging (2.1) the product obtained from stage (1) with (2.2) a chromium compound (component c), which compound is chromium trioxide or a chromium compound which is converted to chromium trioxide under the conditions of stage (3), by treatment with a solution of the chromium compound, with intimate mixing and evaporation of the solvent, and (3) finally keeping the product, obtained from stage (2), in an anhydrous stream of gas, containing oxygen at a concentration of more than 10 percent by volume, for from 10 to 400 minutes, especially from 60 to 300 minutes, at from 600° to 1,000° C., especially from 700° to 950° C., with the proviso that the catalyst contains from 0.1 to 10, especially from 0.5 to 5, parts by weight of component (b) (calculated as aluminum) and from 0.3 to 10, especially from 1 to 5, parts by weight of component (c) (calculated as chromium trioxide) per 100 parts by weight of component (a) (calculated as silicon dioxide).

The following points of detail relating to the new catalyst to be employed in the process of the invention may be noted:

It is manufactured in three stages, referred to above and in the text which follows as (1), (2) and (3).

(1) First stage

In this first stage, the silicate carrier (component a) is charged with the aluminum compound containing alkoxide groups (component b).

For this stage, an advantageous method is, for example, the following: the starting material is the carrier as such or a suspension containing from 5 to 20, preferably from 10 to 15, percent by weight of the carrier, and a solution containing from 0.1 to 20, preferably from 0.5 to 12, percent by weight of the aluminum compound, suitable suspending media and solvents being, in particular, hydrocarbons, above all relatively low-boiling alkane hydrocarbons, e.g. pentanes, hexanes, heptanes or gasolines. Thereafter the components are combined in such a ratio as to give the desired weight ratio of carrier to aluminum compound. In general, they are combined by adding the aluminum component to the carrier component, since this is a more practical procedure than the converse, though the latter is also possible. After combination, the solid phase is isolated. This may be done particularly advantageously by evaporating off the volatile constituents, advantageously whilst constantly keeping the treated material homogeneous. Rotary evaporators, operating under pressures of from 0.01 to 760 mm Hg have, for example, proved suitable for this purpose.

(2) Second stage

In this second stage, the product obtained from stage (1) is charged with the chromium compound.

It has been found that in this stage it is generally advantageous to charge the product, obtained from stage (1), with the desired amount of chromium by treatment with a solution containing from 0.05 to 5

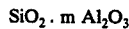

percent by weight of chromium trioxide in an alkanone of 3 to 5 carbon atoms or a solution containing from 0.05 to 15 percent by weight of a chromium compound which is converted to chromium trioxide under the conditions of stage (3), in an alkanol of 1 to 4 carbon atoms (the water content of the solvent used being, in each case, not more than 20 percent by weight and preferably not more than 5 percent by weight), and evaporation of the solvent. Specifically, a suitable method is to suspend the product, obtained from stage (1), in the solution of chromium trioxide or of the chromium compound converted to chromium trioxide under the conditions of stage (3) (the amounts being so chosen as to give the desired ratio of silicate carrier (component a) to chromium compound (component c)) and to evaporate the volatile constituents, i.e. alkanone or alkanol and, where relevant, water, with continuous very homogeneous mixing of the batch. It is most advantageous to work under pressures of from 10 to 760 mm Hg. The question of whether the product, charged with the chromium component, obtained from stage (2) still contains a certain amount of residual moisture is not critical, provided the volatile constituents do not amount to more than 20, and in particular not more than 10, percent by weight based on the silicate carrier (component a).

(3) Third stage

This stage serves for the activation of the cayalyst; it can be carried out in the relevant customary manner, i.e. in particular under conditions which ensure that in the finished catalyst the chromium is at least partially present in the hexavalent state. Appropriate procedures are disclosed, for example, in German Laid-Open Application DOS 1,520,467, page 3 line 11 to page 4, line 3.

It should be noted that essentially the peculiarity of the process of the invention resides in the new catalyst employed.

Provided this catalyst is employed, the process can be carried out in virtually all relevant conventional technological embodiments, i.e. as a batchwise, cyclic or continous process, which processes may be, for example, a suspension polymerization, solution polymerization or dry-phase polymerization, though the first and last of these are the most advantageous. The said technological embodiments, i.e. the technological variants of the Phillips polymerization of olefins, are well known from the literature (the basic content of German Pat. No. 1,051,004 and the subsequently disclosed further developments thereof) and from practical experience, so that further details are superfluous.

However, it remains to be recorded that the new process may be used for homopolymerizing α-monoolefins, especially of 2 to 6 carbon atoms; it is particularly suitable for the manufacture of homopolymers of ethylene. Where copolymers of ethylene with α-monoolefins, or homopolymers of higher α-monoolefins are manufactured, such α-monoolefins are, above all, propene, 1-butene, 4-methyl-1-pentene, 1-hexene and 1-octene. The use of hydrogen as a molecular weight regulator in the process of the invention is generally not necessary, though, if desired, relatively small amounts of such regulators can be present. The flexibility of the new catalysts is a particular advantage. As the relative amount of aluminum compound (component b) employed in stage (1) of the manufacture of the catalyst is increased, polymers of increasing density, increasing melt index and increasing G-modulus are obtained.

In carrying out the polymerization by means of the new catalysts, a further substantial advantage can be gained through the fact that the new catalysts can have a particularly high productivity. In that case, the catalyst constituents in the polymer are present in such small amount that they do not interfere and their removal, which would require a separate process step, can generally be dispensed with.

As regards the constituents of the new catalysts, the following should be noted:

(1) The silicate carrier to be employed in stage (1) is in general an aluminosilicate or, in particular, a silicon dioxide; it is important that this material should conform to the specified parameters and should be very dry (no further weight loss after 6 hours at 160° C. under a pressure of 2 mm Hg). The carrier can advantageously be a xerogel which has been manufactured as described in German Laid-Open Application DOS No. 2,411,735. Examples of suitable aluminum compounds to be employed are ethyl-aluminum diethoxide, diethylaluminum ethoxide, ethyl-aluminum di-(cyclohexanolate), diethylaluminum cyclohexanolate, aluminum triisopropoxide, aluminum tritert.-butoxide, aluminum tri-sec.-butoxide and aluminum tri-(cyclohexanolate).

(2) The chromium compounds to be employed in stage (2) are above all chromium trioxide, but also soluble salts of trivalent chromium with an organic or inorganic acid, e.g. the acetate, oxalate or nitrate; salts of such acids which, an activation, are converted to chromium trioxide without leaving any other residue are particularly suitable. It is also possible to employ chromium compounds in the form of chelates, e.g. chromium acetylacetonate. Examples of alkanol solvents which have proved suitable are tert.-butanol, i-propanol, ethanol and methanol. Amongst the alkanones, acetone has proved particularly suitable.

EXAMPLE (A) Manufacture of the new catalyst (1) First stage 4.23 g of aluminum triethyl are first slowly added dropwise to 1 liter of hexane whilst stirring under a nitrogen atmosphere, and 6.67 g of iso-propanol are then slowly added dropwise under the same conditions. The resulting solution of aluminum triisopropoxide is combined with 100 g of a finely divided xerogel of the formula $SiO_2$, in which the particle diameter is from 40 to 300 μm, the pore volume is 2.1 $cm^3/g$ and the surface area is 369 $m^2/g$.

The constituents are combined at room temperature by first introducing the carrier into the flask of a rotary evaporator and then adding the solution of the aluminum compound. The mixture is then evaporated to dryness at not more than 80° C., the pressure being reduced down to about 20 mm Hg. In the resulting product, the weight ratio of $SiO_2$ to aluminum is 100:1.

(2) Second stage

A solution of 2.2 g of chromium trioxide in 600 ml of acetone (which contains 3 percent by weight of water) is added to the product which has been obtained in stage (1), and has been left in the rotary evaporator, and the solvent is then evaporated off whilst intimately mixing the constituents by virtue of the action of the rotary evaporator. The highest temperature used is 56° C. and the lowest pressure used is 10 mm Hg. The product formed has a weight ratio of $SiO_2$ to $CrO_3$ of 100:2.2.

(3) Third stage

To carry out the activation, the product obtained from stage (2) is kept at 850° C. in a stream of anhydrous oxygen for 120 minutes.

(B) Polymerization

The polymerization is carried out continuously in a stirred reactor of 180 l capacity. During the polymerization, the amounts of suspending medium introduced and removed (each equal to 12 kg of isobutane/hour), the concentration of the monomeric ethylene dissolved in the suspending medium (4 percent by weight, corresponding to an ethylene pressure of 10.7 bars) and the temperature (103° C.) are regulated to keep the stated values constant. In continuous steady-state operation, 1 g/hour of catalyst is introduced and 7,070 g/hour of polyethylene are withdrawn; the polyethylene has a high load melt index (i.e. an MFI 190/20 [g/10 minutes], according to ASTM 1238-65 T) of 40.

We claim:

1. A process for the manufacture of an olefin polymer by polymerizing one or more α-monoolefins 2 to 8 carbon atoms at from 60° to 160° C. and an olefin pressure of from 0.5 to 40 bars, by means of a catalyst obtained from a silicate carrier (component a), an organometallic compound containing alkoxide groups (component b) and a chromium compound (component c), wherein the catalyst employed is obtained by
   (1) first charging
      (1.1) a finely divided xerogel (component a) which has a particle diameter of from 20 to 2,000 μm, a pore volume of from 0.7 to 2.6 cm³/g and a surface area of from 150 to 600 m²/g, and which the formula $SiO_2 \cdot m\ Al_2O_3$ where $m$ is a number from 0 to 2, with
      (1.2) an aluminum compound containing alkoxide groups (component b) of the general formula $R'_p Al(OR'')_{3-p}$ where R' is alkyl of 1 to 8 carbon atoms, R'' is open-chain alkyl of 1 to 8 carbon atoms or cyclic alkyl of 5 to 8 carbon atoms and $p$ is a number from 0 to 2,
   (2) then charging
      (2.1) the product obtained from stage (1) with
      (2.2) a chromium compound (component c), which compound is chromium trioxide or a chromium compound which is converted to chromium trioxide under the conditions of stage (3), by treatment with a solution of the chromium compound, with intimate mixing and evaporation of the solvent, and
   (3) finally keeping the product, obtained from stage (2), in an anhydrous stream of gas, containing oxygen at a concentration of more than 10 percent by volume, for from 10 to 400 minutes at from 600° to 1,000° C., with the proviso that the catalyst contains from 0.1 to 10 parts by weight of component (b) (calculated as aluminum) and from 0.3 to 10 parts by weight of component (c) (calculated as chromium trioxide) per 100 parts by weight of component (a) (calculated as silicon dioxide).

2. A process as claimed in claim 1, wherein the finely divided xerogel has a particle diameter of from 40 to 300 μm, a pore volume of from 1 to 2.5 cm₃/g, a surface area of from 300 to 600 m²/g and the formula $SiO_2 \cdot m\ Al_2O_3$ where $m$ is a number from 0 to 0.5.

3. A process as claimed in claim 1, wherein the formula of the aluminum compound containing alkoxide groups R' is alkyl of 1 to 4 carbon atoms, R'' is alkyl of 6 to 8 carbon atoms, which contains a C₆-ring and $p$ is 0 or 1.

4. A process as claimed in claim 1, wherein the product from stage (2) is kept in stage (3) for from 60 to 300 minutes at from 700° to 950° C. in the anhydrous stream of gas containing oxygen.

5. A process as claimed in claim 1, wherein the catalyst contains from 0.5 to 5 parts by weight of component (b) (calculated as aluminum) and from 1 to 5 parts by weight by component (c) (calculated as chromium trioxide) per 100 parts by weight of component (a) (calculated as silicon dioxide).

6. A process as claimed in claim 1, wherein ethylene is homopolymerized.

7. A process as claimed in claim 1, carried out at a temperature of from 80° to 110° C. and an olefin pressure of from 5 to 15 bars.

* * * * *